United States Patent [19]

Haendler

[11] Patent Number: 4,929,383

[45] Date of Patent: May 29, 1990

[54] STABLE EMULSTIFIED BLEACHING COMPOSITIONS

[75] Inventor: Blanca L. Haendler, Livermore, Calif.

[73] Assignee: The Clorox Company, Oakland, Calif.

[21] Appl. No.: 921,236

[22] Filed: Oct. 20, 1986

Related U.S. Application Data

[63] Continuation-in-part of Ser. No. 840,974, Mar. 13, 1986, abandoned, which is a continuation of Ser. No. 574,565, Jan. 27, 1984, abandoned.

[51] Int. Cl.[5] .................... A01N 59/08

[52] U.S. Cl. .................... 252/187.26; 252/187.25; 106/493; 8/108.1

[58] Field of Search .................... 252/187.25, 187.26; 106/308 M, 493; 524/91, 89, 92, 8, 93, 94, 401, 543, 599; 8/108.1

[56] References Cited

U.S. PATENT DOCUMENTS

| | | | |
|---|---|---|---|
| 3,393,153 | 7/1968 | Zimmerer et al. | 252/95 |
| 3,577,375 | 5/1971 | Clampitt | 524/555 |
| 3,645,911 | 2/1972 | Van Besauw et al. | 264/4.6 |
| 3,663,442 | 5/1972 | Briggs | 252/187.24 |
| 3,666,680 | 5/1972 | Briggs | 252/301.21 |
| 3,689,421 | 9/1972 | Briggs | 252/90 |
| 3,975,280 | 8/1976 | Hachmann et al. | 252/102 |
| 4,009,139 | 2/1977 | Widder et al. | 524/460 |
| 4,072,624 | 2/1978 | Croome et al. | 252/301.35 |
| 4,146,499 | 3/1979 | Rosano | 252/186.32 |
| 4,271,030 | 6/1981 | Brierly et al. | 252/98 |
| 4,457,855 | 7/1984 | Sudbury et al. | 252/98 |
| 4,472,291 | 9/1984 | Rosano | 252/186.28 |
| 4,526,700 | 7/1985 | Hensley et al. | 252/102 |
| 4,533,254 | 8/1985 | Cook et al. | 366/176 |

FOREIGN PATENT DOCUMENTS

| | | |
|---|---|---|
| 0128619 | 12/1984 | European Pat. Off. . |
| 0156438 | 10/1985 | European Pat. Off. . |
| 1084888 | 6/1986 | European Pat. Off. . |
| 60-55100 | 3/1985 | Japan . |
| 1230438 | 5/1971 | United Kingdom . |
| 1329086 | 9/1973 | United Kingdom . |
| 1485643 | 2/1977 | United Kingdom . |
| 1518569 | 7/1978 | United Kingdom . |
| 1568836 | 6/1980 | United Kingdom . |
| 1572353 | 7/1980 | United Kingdom . |

OTHER PUBLICATIONS

Derwent Abstract Accession No. 87-171774/25 European Patent No. 226527, Jun. 24, 1987.

Prince, Ed., *Microemulsions Theory and Practice,* Academic Press, Inc. (1977), pp. 21-56.

Goto et al., Chem. Abs., No. 125941+, vol. 91, Japanese Patent Kokai 7950510, Apr. 20, 1979.

Findley, "Whitener Selection for Today's Detergents," *J. Amer. Oil Chem. Soc.* 60(7), Jul. 1983, pp. 1367-1369.

Korstvedt, "Microfluidization," *Drug and Cosmetic Industry,* Nov. 1984.

Korstvedt, "Microfluidization: For Making Fine Emulsions and Dispersions," *Amer. Paint & Coatings Journal,* Jan. 28, 1985, pp. 38-39.

Chadonnet et al., "Preparation of Microemulsions by Microfluidization," *Soap/Cosmetics/Chemical Specialities,* Feb. 1985.

"Microfluidization: A new Technique Produces Fine Emulsions and Dispersions," *Prepared Foods,* Mar. 1985.

Microfluidics Corporation Literature on "Microfluidization" (undated) Entitled A New Unit process for the Continuous Production of Fine Emulsions, Dispersions and Liposomes.

Korstvedt et al., "Microfluidization: Part I" (undated).

*Primary Examiner*—Amelia Burgess Yarbrough

*Attorney, Agent, or Firm*—Majestic, Parsons Siebert & Hsue

[57] ABSTRACT

A composition useful for treating fabrics is provided which comprises a continuous aqueous phase having a bleaching agent, a lipophilic reticulum in an amount form about 0.015 wt. % to about 11 wt. %, and discrete particles (such as ultramarine blue, a fluorescent whitening agent or both) entrapped in the lipophilic reticulum and stably suspended in the aqueous phase thereby.

10 Claims, No Drawings

STABLE EMULSTIFIED BLEACHING COMPOSITIONS

This application is a continuation-in-part of application Ser. No. 574,565, filed Jan. 27, 1984, now abandoned, through its continuation application Ser. No. 840,974, filed Mar. 13, 1986, now abandoned.

FIELD OF THE INVENTION

The present invention generally relates to liquid compositions useful in treating fabrics, and particularly to liquid bleaching solutions having stably suspended bluing agents and/or fluorescent whitening agents therein which can be essentially free of surfactant.

BACKGROUND ART

A variety of substantially water insoluble particulates are known and useful in treating fabrics. For example, particulate pigments, such as ultramarine blue, are used to mask the undesirable yellow color of fabrics following laundering. During laundering, if the pigment particles are sufficiently small and are dispersed in the laundry solution, then they become entrained in the fabrics. Thus, for example, ultramarine blue particles can be used to mask the yellowed color of the fabrics by partially compensating for the absorption of short wavelength blue.

Although addition of particulates in conjunction with laundering additives is a convenient means of treating fabrics, it has been difficult to sufficiently stably suspend the particulates, particularly in a strongly oxidizing environment such as hypochlorite bleach, while retaining water dispersibility of the solution.

U.S. Pat. No. 4,271,030, issued June 2, 1981, inventors Brierley et al., discloses a liquid hypochlorite bleach having a particulate pigment, such as ultramarine blue, which is said to be stably suspended in the composition by means of a flocculant, such as calcium soap flocs and amine oxides, filling at least 50% of the volume of the composition; and, U.S. Pat. No. 3,663,442, issued May 16, 1972, inventor Briggs, discloses liquid bleaching compositions having a finely particulate styrene copolymer which imparts opacity to the compositions. The styrene copolymer is emulsion polymerized by means of an emulsifying surfactant.

U.S. Pat. No. 3,393,153 to Zimmerer et al., issued July 16, 1968, discloses the use of an oxidized polyethylene emulsion as a stabilizing agent for dispersions of fluorescent whitening agents in bleach. Formation of these emulsions, however, requires the use of surfactant, and the resultant emulsions have been shown substantially to lack both physical and chemical stability.

U.S. Pat. No. 4,526,700, inventors Hensley et al., issued July 2, 1985, discloses aqueous hypochlorite bleach compositions in which a particular optical brightener is in the form of fibrous particles having a density close to that of the aqueous phase. These fibrous particles are formed by dissolving the brightener and certain alkylaryl sulfonate surfactants in water and adding sodium hypochlorite.

U.S. Pat. Nos. 4,146,499 and 4,472,291, inventor Rosano, issued Mar. 27, 1979 and Sept. 18, 1984, respectively, disclose microemulsions including oil, water, at least a primary surfactant, and an oxidizing agent. The individual polymer droplets are said to be substantially entirely covered by adsorbed surfactant.

Thus, prior liquid bleaching compositions which have had particulate laundry additives dispersed by means of a polymeric material have required the presence of one or more surfactants in order to prevent agglomeration and/or settling of the particulate laundry additives.

Although some surfactants are relatively stable to the strong oxidizing environment of hypochlorite, over time there is a tendency towards degradation of surfactant and this may lead to formation of undesirable byproducts in liquid bleaching compositions which include surfactants. Accordingly, it would be desirable to provide liquid bleaching compositions which include stably suspended particulates (such as pigments) and/or fluorescent whitening agents (typically present in crystalline form) without the necessity of a surfactant as a suspending or co-suspending agent.

SUMMARY OF THE INVENTION

It is an object of the present invention to provide a simple and efficient method for stably suspending particulate agents for treating fabrics in aqueous solutions without the necessity for surfactant or non-polymeric dispersing agents, particularly bleaching solutions, with the solutions being readily dispersed during laundering.

Additional objects, advantages, and novel features of the invention will be set forth in part in the description which follows, and in part will become apparent to those skilled in the art on examination.

In one aspect of the present invention, a composition useful for treating fabrics is provided which comprises a continuous aqueous phase having a bleaching agent, a lipophilic phase dispersed in the continuous aqueous phase, and discrete particles suitable for treating fabrics stably suspended by the lipophilic phase in the aqueous phase. The continuous aqueous phase includes from about 1 wt. % to about 15 wt. % of an alkali metal hypochlorite as bleaching agent, and the lipophilic phase is a reticulum of polymer in which the discrete particles are releasably embedded and are dispersed and stably suspended in the continuous aqueous phase. The reticulum is dispersed in the aqueous phase at a plurality of aqueous-lipophilic interfaces which do not need the presence of surfactants in order to be stably suspended.

A particularly preferred embodiment of the invention has polymer as the essential dispersing and suspending agent for one or more particulate laundry additives, contains no surfactant, and has sodium hypochlorite in an amount of from about 4 wt. % to about 6 wt. %. When the inventive composition is used, as by adding to wash water, then the lowered ionic strength causes the polymeric reticulum to release the discrete particles (such as ultramarine blue particles and fluorescent whitening agent), which deposit on clothing being washed.

DETAILED DESCRIPTION OF THE PREFERRED EMBODIMENTS

The present invention provides liquid bleaching compositions having an aqueous solution and which include a dispersed polymeric reticulum in an amount from about 0.015 wt. % to about 11 wt. %, more preferably from about 0.3 wt. % to 2.0 wt. %, in which particles in an amount from about 0.01 wt. % to about 2 wt. % are releasably entrapped. The aqueous solution preferably has from about 0.1 wt. % to about 15 wt. % of a hypochlorite salt, and more preferably from about 1 wt. % to about 10 wt. %. The particles are substantially evenly distributed throughout the polymeric reticulum of the composition, and stably suspended therein. By "releasably entrapped" is meant that upon dilution, such as by adding a quantity of the inventive composition (typically about one cup, or 240 ml) to wash water, then the polymeric reticulum reverts to a latex form and releases the particles into the wash for deposition onto the fabrics. When added to a wash solution, the ionic strength of the composition in such a diluted solution is thus lowered, and the particles (such as pigments and optical brighteners) are released.

Compositions of the invention will typically have relatively low viscosity (about 1 to about 60 centipoise, or 0.001 to 0.06 pascal second), and thus are readily poured or dispensed for use. Preferred compositions have a pH of at least about 10.5, preferably a pH between about 12.5 to about 13.2.

These high pH's appear necessary to promote optimum physical and chemical stability of the bleach compositions. To achieve these high pH's, it is preferred to add a source of caustic, preferably sodium hydroxide. Preferred amounts of sodium hydroxide are from about 0.01 to about 5.0 wt. %, more preferably from about 0.5 wt. % to about 2.0 wt. %, and most preferably from about 1.0 to about 1.75 wt. %. While sodium hydroxide is preferred, other alkali metal hydroxides (e.g., potassium hydroxide, lithium hydroxide) are suitable. Alkali metal carbonates and silicates may also provide the proper high pH.

Particulates for suspending in compositions of the present invention include various known pigments. Suitable pigments include aluminosiliates, such as the ultramarines (red, grden, violet and blue), zeolites, and simple metal oxides (such as titanium dioxide and chromium dioxide). Pigment particulates useful in the present invention are substantially water insoluble, inert in the compositions, and often have a higher density than the aqueous solutions in which they are desirably dispersed for fabric treatment. For example, ultramarine blue has a density of 2.35 g/cc, and ultramarine blue particles begin settling out of aqueous solution within about four hours, even when the particles are of very small size. Pigment particle size will generally be from about 0.5 to about 50 microns, preferably from about 0.5 to about 2 microns, and the pigment particles will preferably be in an amount of from about 0.01 wt. % to about 1 wt. %, more preferably be about 0.05 wt. %.

Compositions of the invention can also include fluorescent whitening agents. Fluorescent whitening agents, also known as optical brighteners, or brighteners, are adsorbed by textile fibers and impart to the fabric an improved degree of whiteness or brightness (fluorescence) by means of their chemical ability to absorb ultraviolet radiation and re-emit visible radiation, and have found widespread use as components of household detergent compositions. In order to provide substantial fabric whitening, it is desirable to combine the optical brightening capacity of fluorescent whitening agents with an effective bleach.

Suitable brighteners which can be used in the practice of the present invention include compounds which tend to be resistant to chlorine bleaches and which will deposit onto cotton fabric. Particularly suitable compounds include the disodium salt of 2,2-(4,4'-biphenylene divinylene)-dibenzenesulfonic acid (manufactured and sold under the name Tinopal CBS-X by Ciba-Geigy Corporation of Greensboro, N.C.) having the structure

FORMULA 1

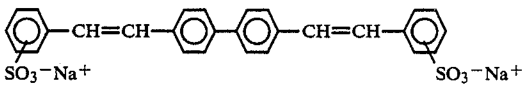

and Phorwite BHC 766 (manufactured by Mobay Corporation of Union, N.J.) which has the following structure:

FORMULA 2

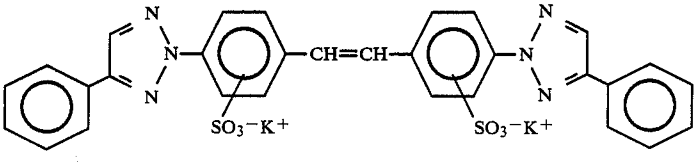

Alkaline earth, alkali metal, zinc, and other multivalent salts (such as the metals of Group IIIA of the periodic table of the elements) of these compounds are also suitable brightening agents, as are the fluorescent whitening agents disclosed in previously noted U.S. Pat. No. 3,393,153 to Zimmerer, et al., which is incorporated by reference.

Although suitable brighteners tend to be resistant to chlorine bleaches, nevertheless it has been found that exposure directly to the aqueous hypochlorite solution leads to a substantial loss of fluorescence. For example, simply admixing and agitating oxidized polyethylene latex (including surfactant), water and optical brightener particles and then adding this mixture to a hypochlorite solution can provide a composition having initially suspended optical brightener particles; however, after a period as short as 24 hours, the optical brightener particles settle out of such a composition, and lose a significant amount of the original intensity. By contrast, it is believed that the polymeric reticulum (in which the particles are embedded, or entrapped) protects against the harsh oxidizing environment until the composition is diluted in the wash solution and releases the particles for deposition onto the fabrics. Fluorescent stability for optical brighteners utilized in compositions of the invention (stored at 70° F. or 100° F. for 12 weeks) has been measured and found to be sufficient to ensure acceptable brightening of fabrics.

The brighteners are typically present in the inventive compositions in crystalline form with densities greater than that of the solutions, and thus would tend to separate and settle as solids in the solutions were no dispersing or suspending agents present. The concentration of brightener in the bleach composition preferably is between about 0.01 wt. % and about 0.2 wt. %; a particularly preferred concentration is approximately 0.1 wt. %.

Compositions in accordance with the present invention are prepared from a polymeric latex as an initial composition. The initial composition is a stable dispersion of suitable polymer which can be essentially free of surfactant.

Application Ser. No. 574,565, filed Jan. 27, 1984, now continuing as copending Ser. No. 840,974, filed Mar. 13, 1986, inventors Cramer and Haendler, of common assignment herewith, discloses liquid bleaching solutions having stably suspended ultramarine blue particles. The particles of these liquid bleaching compositions are suspended by means of an oxidized polyethylene polymer, or polyethylene-acrylic acid copolymer, and surfactant, which together form a polymeric latex into which the particles are dispersed.

Copending Application Ser. No. 748,306, filed June 24, 1985, inventor Cramer, of common assignment herewith, discloses liquid bleaching solutions having stably suspended ultramarine blue particles, and in addition include a fluorescent whitening agent. An oxidized polyethylene polymer, or polyethylene-acrylic acid copolymer, and surfactant together form a polymeric latex into which the fluorescent whitening agent and the ultramarine blue particles are dispersed.

As with these copending applications, the subject compositions (hereinafter sometimes referred to as the "resultant compositions") include the polymeric reticulum, or matrix, in which the particles are releasably entrapped. However, the polymer of the present invention's initial composition (from which the resultant composition is made) is in the form of solid droplets in an aqueous solution having an average diameter less than about 1 micron, and which do not need the presence of surfactant to be stably dispersed in the aqueous solution. Thus, the inventive compositions resulting from such initial compositions preferably do not include any surfactant, since surfactant is a source of potential chemical decomposition and thus of by-products in the bleaching agent environment. The polymer droplets of the initial composition form a discontinuous, lipophilic phase which is dispersed in the continuous aqueous phase. The size of the polymer droplets is believed to approach about 0.25$\mu$, where Brownian Motion is a factor contributing to the suspension's stability.

Polymer droplets of this small size and having a relatively narrow, or homogeneous, size distribution are preferably formed by turbulent jet interaction at a high pressure of at least about 4,000 psi, typically about 9,000 psi, by ejecting the polymer, in the presence of an aqueous solution, through at least two nozzles under the high pressure and forming a plurality of thin fluid sheets. These thin fluid sheets are impinged along a common liquid interaction front. The just described formation of polymer droplets may be by means of the apparatus described in U.S. Pat. No. 4,533,254, issued Aug. 6, 1985, inventors Cook et al., incorporated herein by reference. Initial compositions so formed are physically stable—despite the preferred absence of surfactant—and the droplets remain dispersed and suspended in the solution for periods of at least about 18 months. This is advantageous in the commercial production of the final, or resultant, composition (having the dispersed polymeric reticulum), since an initial composition which coagulates within a relatively short period of time will prevent or disrupt the production of final product.

Sonication was tested in making an initial composition with a polymeric latex. Sonication is a well-known method for reducing droplet size and for increasing homogenity of a solution, and has been practiced with preparations of latex polymer particles for light scattering immunoassay applications. See, U.S. Pat. No. 4,401,765, issued Aug. 30, 1983, inventors Craig et al. Although it has been found that apparently stable, resultant compositions (having the necessary lipophilic reticulum) can be made in the laboratory by sonicating the initial composition, sonication is not preferred to form the polymer droplets of the initial composition in accordance with the invention because the size and distribution of polymer droplets in an initial composition have been found to be relatively unaffected by sonication, and sonicated initial compositions have been found to coagulate fairly rapidly within 24 hours.

Suitable polymers for forming the initial composition in accordance with the invention include oxidized polyethylenes and polyethylene-acrylic acid copolymers, which have melting points in the range of about 90° C. to about 120° C., and which can be neutralized prior to formation of the initial composition. However, among the polymers useful for the present invention is polyethylene itself.

Oxidized polyethylenes suitable for the present invention may vary considerably in structure. One suitable oxidized polyethylene has the general formula shown by Formula 3, below, where "R" may be hydrogen or alkyl groups. The ether and ester functionalities may be linear (as illustrated by Formula 3) or be intramolecularly bonded ring structures. The oxidized polyethylenes typically have a molecular weight of about 400 to about 3000 and have acid numbers from about 30 to about 120.

$$HO\underset{\underset{O}{\|}}{C}(CH_2)_x\underset{\underset{O}{\|}}{C}(CH_2)_yO(CH_2)_z\underset{\underset{O}{\|}}{C}OR \qquad \text{FORMULA 3}$$

wherein the total of x, y and z is from about 35 to about 250.

Preferred polyethylene-acrylic acid copolymer acids are slightly branched polyethylene chains containing no oxygen functionality other than carboxyl groups, and have the general structure illustrated by Formula 4, below. Molecular weight is typically from about 500 to about 6000, and the copolymers have acid numbers from about 25 to about 180, more preferably from about 30 to about 70.

$$R_1\text{-}(CH_2CH_2)_x\text{-}(CH_2\overset{\overset{COOH}{|}}{C}H)_y\text{-}R_2 \qquad \text{FORMULA 4}$$

wherein the total of x and y is from about 12 to about 195, $R_l$ may be methyl or carboxyl, and $R_2$ may be methyl or hydrogen.

Saponification and/or neutralization of the polymer may be performed prior to formation of the latex, preferably with elevated pressure, in order to provide ionic groups on the polymer which aid in dispersing the polymer in aqueous solution. However, ionic groups are not believed to be essential. (The oxidized polyethylene is typically both saponified and neutralized. The polyethylene-acrylic acid copolymer is typically neutralized.)

Particularly preferred amounts of polymer (as reticulum) in the inventive compositions are from about 0.12 wt. % to about 0.50 wt. %. A preferred process for making compositions of the invention is generally illustrated by Example I and a process for making a preferred embodiment in accordance with the present invention is described by Example II.

EXAMPLE 1

(a) Melted polymer (polyethylene, polyethylene-acrylic acid copolymer or oxidized polyethylene) is dispersed in an aqueous solution and then filtered. When oxidized polyethylene is utilized, then it is preferably saponified and neutralized. When polyethylene-acrylic acid copolymer is utilized, it is preferably neutralized.

(b) The polymeric mixture is then processed through a Microfluidizer apparatus for a sufficient number of passes to reduce substantially all of polymeric droplets to a size less than 1 micron, with the majority of polymeric droplets being at a particle size of about 0.25 microns. The apparatus ejects the polymeric mixture through a plurality of nozzles under high pressure (about 9,000 psi) so as to form a plurality of thin fluid sheets, which are impinged along a common liquid interaction front. This is the initial composition.

(c) The desired quantity of discrete particles suitable for treating fabrics are admixed into the polymeric latex from step (b).

(d) Liquid sodium hypochlorite bleach is then slowly added to the admixture of step (c), with stirring, until the increased ionic strength causes the latex to invert and to form a reticulum entrapping the particles. This is the resultant composition.

EXAMPLE II (a) Polyethylene-acrylic acid copolymer (AC580 available from Allied Chemical Company) 70 g was heated to about 120° C. and neutralized with NaOH (3.5 g NaOH). Boiling water (626.5 g) was slowly added with propeller mixing. The neutralized polymeric mixture was allowed to cool to room temperature with continuous stirring, and was then filtered.

(b) The polymeric mixture of step (a) was processed through a Microfluidizer apparatus (available from Microfluidics Corporation, and described in U.S. Pat. No. 4,533,254, issued Aug. 6, 1985, inventors Cook et al.), for a sufficient number of passes (about 10) to reduce the majority of polymeric droplets to an average particle size of about 0.25 microns. The particle size was determined by quasi-elastic laser light scattering. The reduction in particle size as a function of passes is illustrated by Table I, below.

TABLE I

| # of Cycles | Particle Size (μ) |
|---|---|
| 1 | 0.38 |
| 5 | 0.30 |
| 10 | 0.25 |

The resultant latex dispersion (i.e., the initial composition) from step (b) had lipophilic, or polymeric, droplets dispersed and stably suspended in the aqueous solution along a plurality of aqueous-lipophilic interfaces which were essentially free of surfactant, and was found to maintain stability (dispersion and suspension of polymer droplets) at least for 18 months. Photomicrographs of the initial composition showed the polymer droplets to be sub-micron in size.

(c) The desired quantity of discrete particles (0.2 g of ultramarine blue; 0.4 g of Tinopal CBS-X) suitable for treating fabrics were admixed into 14.0 g of the resultant polymer latex from step (b).

(d) Liquid sodium hypochlorite bleach (366.0 g), 15.4 g water and 4.0 g NaOH were slowly added to the admixture of step (c), with stirring. The increased ionic strength caused the latex to invert and to form a reticulum entrapping the particles.

For comparison to an initial composition formed as described in steps (a) and (b) of Example II, two comparative initial compositions were prepared as described by Example III.

EXAMPLE III (a) Polyethylene-acrylic acid copolymer (AC-580 available from Allied Chemical Company, 40g) was heated to about 120° C. and neutralized with NaOH (2.0 g NaOH in 10 g of hot water). Boiling water (348.0 g, distilled) was slowly added with propeller mixing over 10 minutes. The neutralized polymeric mixture was allowed to cool to room temperature with continuous stirring, and was then filtered. The polymeric mixture was separated into two fractions. Fraction A was sonicated as described in step (b) below, whereas fraction B was untreated.

(b) Fraction A was sonicated in a Bronson model B220 sonicator for 18 hours.

Optical photomicrographs (600X) were then taken of the untreated fraction A and the sonicated fraction B. The fractions appeared to be substantially the same in the photomicrographs and both had a number of droplets that appeared to be on the order of about 3–5μ. Both fractions began to coagulate and to separate in the solution within about 24 hours. After one week, both the sonicated fraction B and the untreated fraction A had an upper layer of coagulum.

EXAMPLE IV

An inventive composition was prepared as described by Examples I and II having 0.45 wt. % polymer (AC-580), 1.00 wt. % NaOH, 0.1 wt. % Tinopal CBS-X optical brightener, 0.05 wt. % UMB, 5.0 wt. % NaOCl, and the remainder (93.4 wt. %) water. The chemical stability of the composition was determined by storing samples of the composition at 70° F. and at 100° F. and monitoring the % w/w of NaOCl over time. The data is set out in Table II, below.

TABLE II

| | % w/w NaOCl | |
|---|---|---|
| Elapsed Time | 70° F. | 100° F. |
| 0 | 5.01 | 5.01 |
| 3 Weeks | 4.92 | 4.30 |
| 8 Weeks | 4.83 | 3.48 |
| 12 Weeks | 4.72 | 2.87 |

As can be seen by the data of Table II, above, the inventive composition displayed good hypochlorite stability.

EXAMPLE V

An inventive composition was prepared as generally described by Examples I and II having 0.35 wt. % polymer (AC-580), 1.0 wt. % NaOH, 0.10 wt. % optical brightener (Tinopal CBS-X), 0.05 wt. % ultramarine blue, 5.0 ±0.1 wt. % NaOCl, 3.9 ±0.1 wt. % NaCl, and the rest water. The physical stability of the composition was measured by monitoring samples of the composition which had been stored either at 70° F. or at 100° F. over a period of time. The monitoring of the data is illustrated in Table III, below, where a value of "0" represents no separation of UMB particles (that is, the particles are suspended in and dispersed throughout the aqueous bleaching composition), a value of "1" represents substantially complete separation (blue particles floating on top), and a value of "−1" also represents substantially complete separation (blue particles settled to the bottom). However, a product having a value in the range of 0 to 1 is considered acceptable, since the lipophilic reticulum will be in the upper layer of solution, will be poured from the container into the wash, and then be dispersed during the washing cycle.

TABLE III

| | Physical Stability | |
|---|---|---|
| Elapsed Time | 70° F. | 100° F. |
| 1 Week | +0.40 | +0.70 |
| 2 Weeks | +0.51 | +0.73 |
| 3 Weeks | +0.53 | +0.75 |
| 4 Weeks | +0.56 | +0.79 |

As can be seen from the data of Table III, the composition in accordance with the invention displayed good to acceptable physical stability, even at 100° F.

The present composition may be prepared with no separation of particles (that is, to have a value of "0" as described above). Thus, for example, an inventive composition having 0.33 wt. % polymer (AC-580), 1.0 wt. % NaOH, 0.10 wt. % optical brightener (Tinopal CBS-X), 0.05 wt. % ultramarine blue, 5.0±0.1 wt. % NaOCl, 3.9±0.1 wt. % NaCl, and the rest water will have a value of about "0" at 70° F. However, it is preferred to manufacture the lipophilic reticulum (with the embedded particles) in the upper portion of the composition when prepared commercially for aesthetic reasons and when packaged in an opaque container.

EXAMPLE VI

Nine different inventive compositions, with polymer varying in amounts between about 0.30 wt. % to about 0.55 wt. %, and including either pigment particles (0.05 wt. % ultramarine blue), or fluorescent whitening agent (0.1 wt. % Tinopal CBS-X), or both, were prepared in a manner analogous to Example I. All nine exhibited chemical and physical stability. All nine of the compositions included 1.0 wt. % NaOH and had from 5.0 to 5.2 wt. % NaOCl.

It is to be understood that while the invention has been described in conjunction with preferred specific embodiments, that the foregoing description as well as the examples, are intended to illustrate and not limit the scope of the invention, which is defined by the scope of the appended claims. Other aspects, advantages and modifications within the scope of the invention will be apparent to those skilled in the art to which the invention pertains.

I claim:

1. A method of preparing a liquid composition useful for treating fabrics comprising:

providing a quantity of an oxidized polyethylene, a polyethylene-acrylic acid copolymer, or a mixture thereof;

subjecting the polymer in the presence of water to turbulent jet interaction sufficient to form a latex in which a lipophilic phase thereof is formed of polymer droplets having an average diameter of submicron size;

admixing a quantity of substantially water insoluble discrete particles suitable for treating fabrics into the latex; and slowly admixing an aqueous bleaching solution into the latex until the polymer droplets form a lipophilic reticulum in which the discrete particles are entrapped.

2. The method as in claim 1 wherein the turbulent jet interaction is conducted at a pressure of at least about 4,000 psi.

3. The method as in claim 1 wherein the oxidized polyethylene is saponified and neutralized and the polyethylene-acrylic acid copolymer is neutralized before being subjected to the turbulent jet interaction.

4. The method as in claim 1 wherein the aqueous bleaching solution has from about 4 wt. % to about 6 wt. % sodium hypochlorite and a pH of at least about 10.5.

5. The method as in claim 4 wherein the discrete particles are releasably entrapped.

6. The method as in claim 5 wherein the discrete particles are released upon sufficient dilution of the composition.

7. The method as in claim 1 or 4 wherein the discrete particles include ultramarine blue or distrylbiphenyl derivatives, stilbene derivatives, alkali metal or multivalent salts and mixtures thereof.

8. The method as in claim 1 wherein the polymer has a molecular weight of about 400 to about 6000.

9. The method as in claim 1 wherein the lipophilic reticulum is dispersed in the aqueous solution at a plurality of aqueous-lipophilic interfaces.

10. The method as in claim 9 wherein the plurality of aqueous-lipophilic interfaces are substantially free of surfactant.

* * * * *

UNITED STATES PATENT AND TRADEMARK OFFICE

CERTIFICATE OF CORRECTION

PATENT NO. : 4,929,383

DATED : MAY 29, 1990

INVENTOR(S) : BLANCA L. HAENDLER

It is certified that error appears in the above-identified patent and that said Letters Patent is hereby corrected as shown below:

Title of Patent [54]: replace "EMULSTIFIED"
Column 1, line 2: with --EMULSIFIED--

Signed and Sealed this

First Day of October, 1991

Attest:

HARRY F. MANBECK, JR.

Attesting Officer

Commissioner of Patents and Trademarks